US008913275B2

(12) United States Patent
Hoshina et al.

(10) Patent No.: US 8,913,275 B2
(45) Date of Patent: Dec. 16, 2014

(54) IMAGE FORMING SYSTEM

(75) Inventors: Takayuki Hoshina, Tokyo (JP); Makoto Nishimura, Tokyo (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 13/309,046

(22) Filed: Dec. 1, 2011

(65) Prior Publication Data
US 2012/0327457 A1 Dec. 27, 2012

(30) Foreign Application Priority Data

Jun. 27, 2011 (JP) .................................. 2011-141926

(51) Int. Cl.
G06F 3/12 (2006.01)
G06F 15/00 (2006.01)
G06K 1/00 (2006.01)
G06K 15/00 (2006.01)
G06F 21/60 (2013.01)

(52) U.S. Cl.
CPC ............ G06F 21/608 (2013.01); G06F 3/1267 (2013.01); G06F 3/1222 (2013.01); G06F 3/1288 (2013.01); G06F 3/1204 (2013.01); G06F 3/126 (2013.01)
USPC ......... 358/1.15; 358/1.9; 358/1.13; 358/1.18; 358/1.16; 709/201; 709/204; 709/213; 709/217

(58) Field of Classification Search
USPC ............ 358/1.13, 1.14, 1.15, 1.16, 401, 403, 358/407, 444, 1.9, 1.18; 707/607, 608, 626, 707/628, 629, 632, 633, 635, 610, 617, 620, 707/622, 623, 627, 634, 713, 715, 716, 718, 707/726, 736, 741, 781, 782, 783, 784, 785, 707/786; 709/201, 204, 213, 217
See application file for complete search history.

(56) References Cited

U.S. PATENT DOCUMENTS

| 6,862,583 | B1* | 3/2005 | Mazzagatte et al. ............ 705/64 |
| 7,761,470 | B2* | 7/2010 | Yokokura ...................... 707/783 |
| 7,821,660 | B2* | 10/2010 | Kitada ......................... 358/1.15 |
| 8,154,752 | B2* | 4/2012 | Shaw et al. ................... 358/1.15 |

(Continued)

FOREIGN PATENT DOCUMENTS

| JP | A-2005-136459 | 5/2005 |
| JP | A-20011-242851 | 10/2008 |

OTHER PUBLICATIONS

Feb. 5, 2013 Office Action issued in Australian Patent Application No. 2011256891.

*Primary Examiner* — Fred Guillermety
*Assistant Examiner* — Jonathan Beckley
(74) *Attorney, Agent, or Firm* — Oliff PLC

(57) ABSTRACT

An image forming system includes plural server devices, a transmission device, and an image forming device. The transmission device includes a first memory, a selection unit, and a transmission unit. The first memory stores priorities assigned to the server devices. The selection unit selects an available server device having the highest priority. The transmission unit transmits user identification information and associated image data to the selected server device. Each server device includes a storage location for storing the transmitted identification information and image data. The image forming device includes a second memory, an acquisition unit, and an image forming unit. The second memory stores server information. Upon receipt of user identification information, the acquisition unit acquires image data associated with the user identification information from the storage location in the server device identified by the server information. The image forming unit forms an image corresponding to the acquired image data.

5 Claims, 9 Drawing Sheets

(56) References Cited

U.S. PATENT DOCUMENTS

| | | | |
|---|---|---|---|
| 8,339,639 B2 * | 12/2012 | St. Jacques et al. | 358/1.15 |
| 8,424,103 B2 * | 4/2013 | Kitada | 726/28 |
| 8,576,434 B2 * | 11/2013 | Yada et al. | 358/1.15 |
| 8,610,922 B2 * | 12/2013 | Kashioka | 358/1.15 |
| 8,625,138 B2 * | 1/2014 | Ida et al. | 358/1.15 |
| 2006/0031186 A1 * | 2/2006 | Yokokura | 707/1 |
| 2007/0171467 A1 * | 7/2007 | Mokuya et al. | 358/1.15 |
| 2008/0244756 A1 | 10/2008 | Kitada | |
| 2009/0009802 A1 * | 1/2009 | Shaw et al. | 358/1.15 |
| 2010/0223467 A1 * | 9/2010 | Dismore et al. | 713/168 |
| 2012/0320412 A1 * | 12/2012 | Yoshimura et al. | 358/1.15 |

* cited by examiner

| SERVER INFORMATION | PRIORITY |
|---|---|
| serverA | 1 |
| serverB | 2 |
| serverC | 3 |

FIG. 6

| USER ID | PASSWORD |
|---------|----------|
| user001 | 1234 |
| user002 | 5678 |
| ... | ... |

| SERVER INFORMATION | PRIORITY |
|--------------------|----------|
| serverA | 1 |
| serverB | 3 |
| serverC | 2 |

44

| SERVER INFORMATION | PRINT DATA ||
| | USER ID | FILE NAME |
| --- | --- | --- |
| serverA | — | — |
| serverB | user001 | IMAGE DATA D1 |
| serverC | user002 | IMAGE DATA D2 |

45

IMAGE FORMING SYSTEM

CROSS-REFERENCE TO RELATED APPLICATIONS

This application is based on and claims priority under 35 USC 119 from Japanese Patent Application No. 2011-141926 filed Jun. 27, 2011.

BACKGROUND (i) Technical Field

The present invention relates to an image forming system.

(ii) Related Art

Techniques have been available in which image data specified by a user is stored in a print server device to enable the image data to be accessed from plural image forming devices.

SUMMARY

According to an aspect of the invention, there is provided an image forming system including plural server devices, a transmission device, and a first image forming device. The transmission device includes a first memory, a first selection unit, and a first transmission unit. The first memory stores first priorities set individually for the plural server devices. The first selection unit selects an available server device for which the first priority stored in the first memory is highest from among the plural server devices. The first transmission unit transmits identification information identifying a user and image data associated with the identification information to the server device selected by the first selection unit. Each of the plural server devices includes a first storage location in which the identification information and image data transmitted from the first transmission unit are to be stored in association with each other. The first image forming device includes a second memory, a first acquisition unit, and a first image forming unit. The second memory stores server information identifying the plural server devices. Upon receipt of identification information input from a user, the first acquisition unit acquires image data stored in association with the input identification information from the first storage location in a server device identified by the server information stored in the second memory among the plural server devices. The first image forming unit forms an image corresponding to the image data acquired by the first acquisition unit.

BRIEF DESCRIPTION OF THE DRAWINGS

Exemplary embodiment(s) of the present invention will be described in detail based on the following figures, wherein:

FIG. 6 illustrates an example of authentication information;

FIG. 7 illustrates an example of a server list stored in the image forming device;

DETAILED DESCRIPTION

Figure 1:
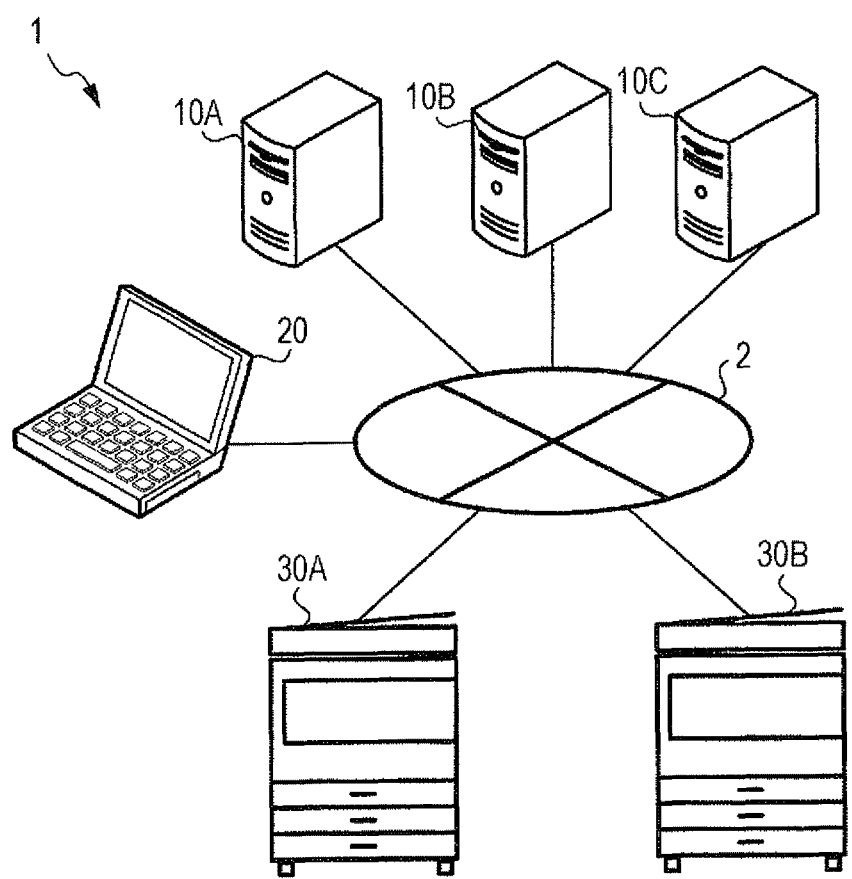
FIG. 1 is a schematic view illustrating a configuration of an image forming system.

FIG. 1 is a schematic view illustrating the configuration of an image forming system 1 according to an exemplary embodiment. The image forming system 1 includes server devices 10A, 10B, and 10C, a client device 20, and image forming devices 30A and 30B. The server devices 10A, 10B, and 10C will be referred to as the "server devices 10" or the "server device 10" individually without the addition of the letters "A", "B", and "C" to the numeral if they need not be identified individually. Likewise, the image forming devices 30A and 30B will be referred to as the "image forming devices 30" or the "image forming device 30" individually without the addition of the letters "A" and "B" to the numeral if they need not be identified individually. The client device 20 (an example of a transmission device) has a function for transmitting print data to the server device 10. The server device 10 has a storage location that stores print data transmitted from the client device 20. The term "storage location", as used herein, refers to an area where data is to be stored. The server device 10 has a function for transmitting print data stored in the storage location to the image forming device 30. The image forming device 30 may be, for example, an electrophotographic printer.

Figure 2:
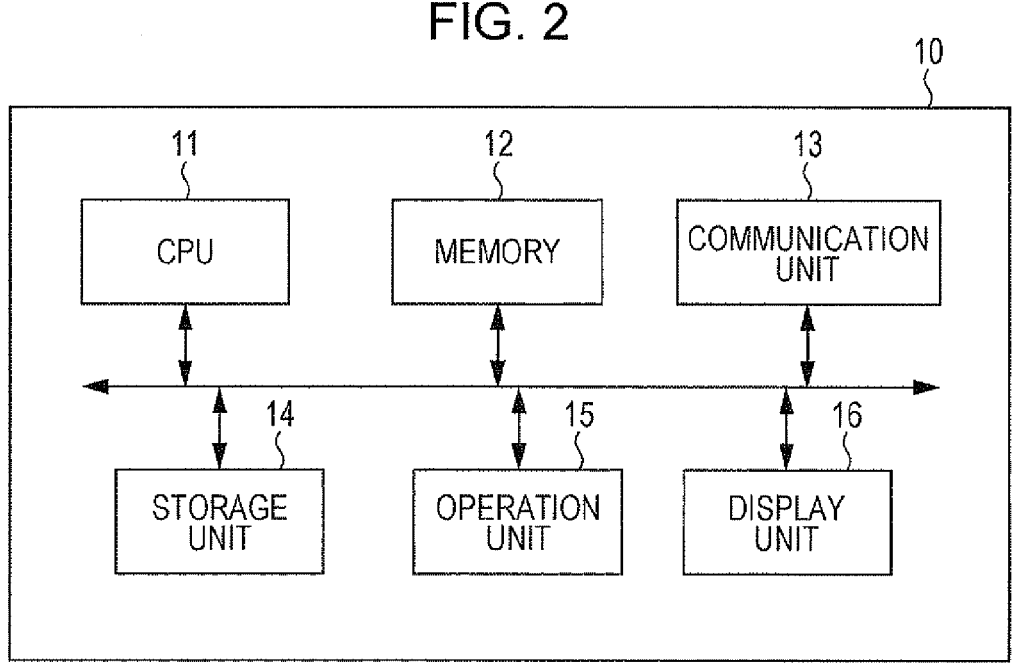
FIG. 2 illustrates a hardware configuration of a server device.

FIG. 2 illustrates a hardware configuration of the server device 10. The server device 10 includes a central processing unit (CPU) 11, a memory. 12, a communication unit 13, a storage unit 14, an operation unit 15, and a display unit 16. The CPU 11 executes a program stored in the memory 12 to control each unit of the server device 10. The communication unit 13 may be a communication interface configured to be connected to a communication line 2. The CPU 11 communicates with the client device 20 or the image forming device 30 via the communication unit 13. The storage unit 14 may be a storage device such as a hard disk. The storage unit 14 may be a storage location for storing print data transmitted from the client device 20. The operation unit 15 includes, for example, a keyboard and a mouse. The operation unit 15 may be used to operate the server device 10. The display unit 16 may be a display such as a liquid crystal display. The display unit 16 may display an image corresponding to image data.

Figure 3:
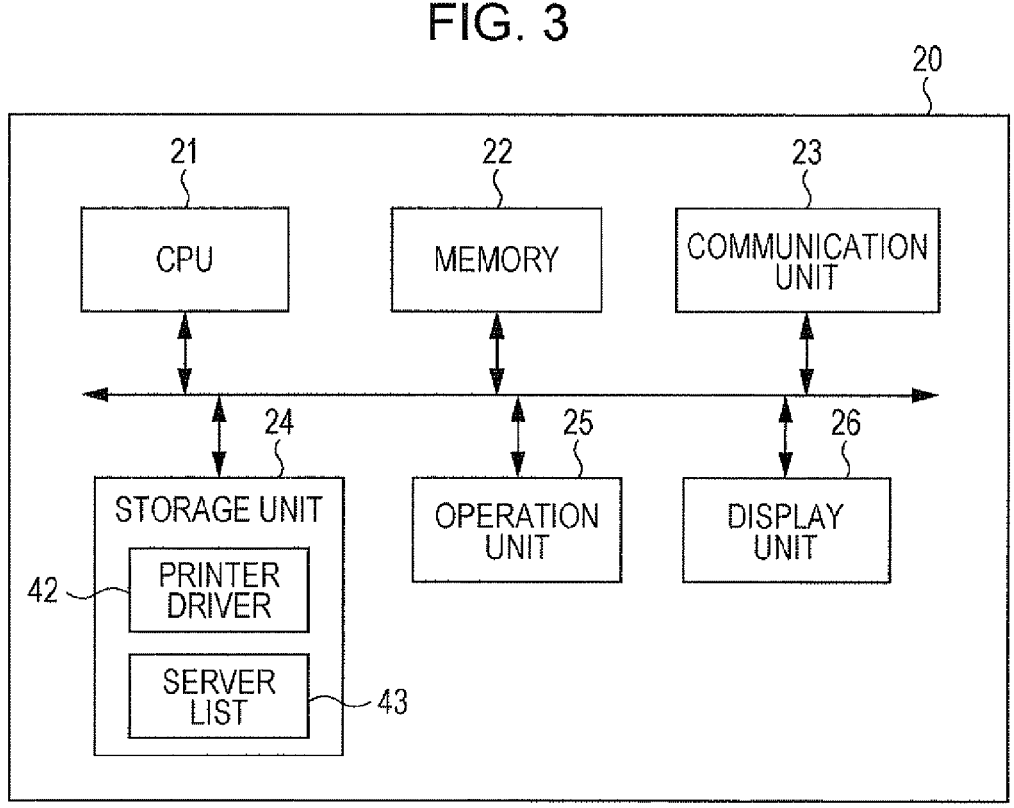
FIG. 3 illustrates a hardware configuration of a client device.

FIG. 3 illustrates the hardware configuration of the client device 20. The client device 20 includes a CPU 21, a memory 22, a communication unit 23, a storage unit 24, an operation unit 25, and a display unit 26. The CPU 21 executes a program stored in the memory 22 to control each unit of the client device 20. The communication unit 23 may be a communication interface configured to be connected to the communication line 2. The CPU 21 communicates with the server device 10 or the image forming device 30 via the communication unit 23. The storage unit 24 may be a memory such as a hard disk. The storage unit 24 (an example of a first memory) stores a printer driver 42 and a server list 43. The printer driver 42 may be a program having a function for controlling the image forming device 30. The user ID of the user who uses the client device 20, e.g., "user001", is set in the printer driver 42. The server list 43 may be information indicating all the server devices 10 included in the image forming system 1. The operation unit 25 includes, for example, a keyboard and a mouse. The operation unit 25 may be used to operate the client device 20. The display unit 26 may be a display such as a liquid crystal display. The display unit 26 may display an image corresponding to image data.

Figures 4, 5:
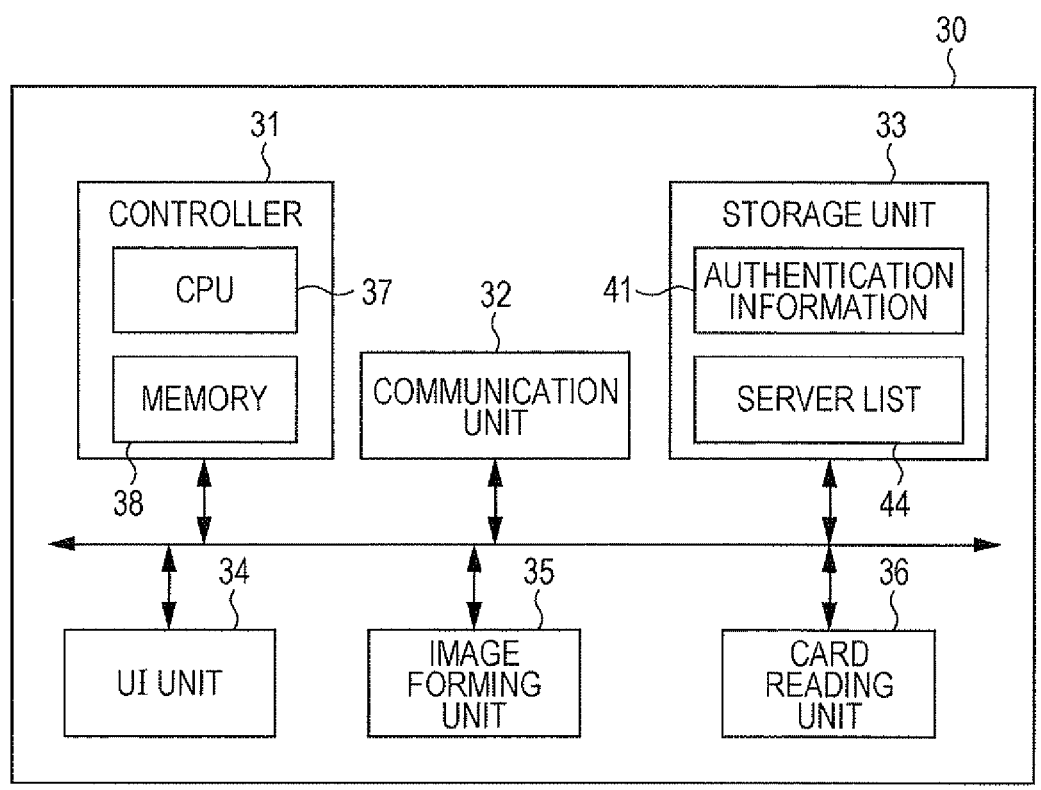
FIG. 4 illustrates an example of a server list stored in the client device.
FIG. 5 illustrates a hardware configuration of an image forming device.

FIG. 4 illustrates an example of the server list 43. The server list 43 contains server information and priorities (an example of first priorities). The server information may be information identifying each of the server devices 10 included in the image forming system 1. For example, the server information may be the name or Internet Protocol (IP) address of each of the server devices 10. In the server list 43 illustrated in FIG. 4, server information "serverA" represents the server device 10A, server information "serverB" represents the server device 10B, and server information "serverC" represents the server device 10C. The priorities are assigned to the individual server devices 10. The priority assignment may be performed by, for example, user operation. The priorities may be used to select a server device 10 to which print data is to be transmitted.

FIG. 5 illustrates the hardware configuration of the image forming device 30. The image forming device 30 includes a controller 31, a communication unit 32, a storage unit 33, a user interface (UI) unit 34, an image forming unit 35, and a card reading unit 36. The controller 31 includes a CPU 37 and a memory 38. The CPU 37 executes a program stored in the memory 38 to control each unit of the image forming device 30. The communication unit 32 may be a communication interface configured to be connected to the communication line 2. The controller 31 communicates with the server device 10 or the client device 20 via the communication unit 32. The storage unit 33 may be a memory such as a hard disk. The storage unit 33 (an example of a second memory) stores authentication information 41 and a server list 44.

FIG. 6 illustrates an example of the authentication information 41. The authentication information 41 contains a user ID and a password. The user ID may be identification information identifying an individual user. The password may be information to be used to authenticate the identity of an individual user. The password may be set by the user.

FIG. 7 illustrates an example of the server list 44. Similarly to the server list 43 described above, the server list 44 contains server information and priorities (an example of second priorities). The priorities in the server list 44 may be used to select a server device 10 requested to transmit print data. The priorities in the server list 44 may not necessarily be identical to the priorities in the server list 43 described above.

In FIG. 5, the UI unit 34 may include, for example, a touch screen and keys. The UI unit 34 may be used to operate the image forming device 30. The image forming unit 35 forms an image corresponding to image data on a sheet of paper. The card reading unit 36 contactlessly reads information stored in an integrated circuit (IC) card. The IC card is delivered to a user in advance in order to authenticate the user. The IC card stores the user ID "user001" and the password of the user, e.g., "1234" which are included in the authentication information 41 described above.

Figure 8:
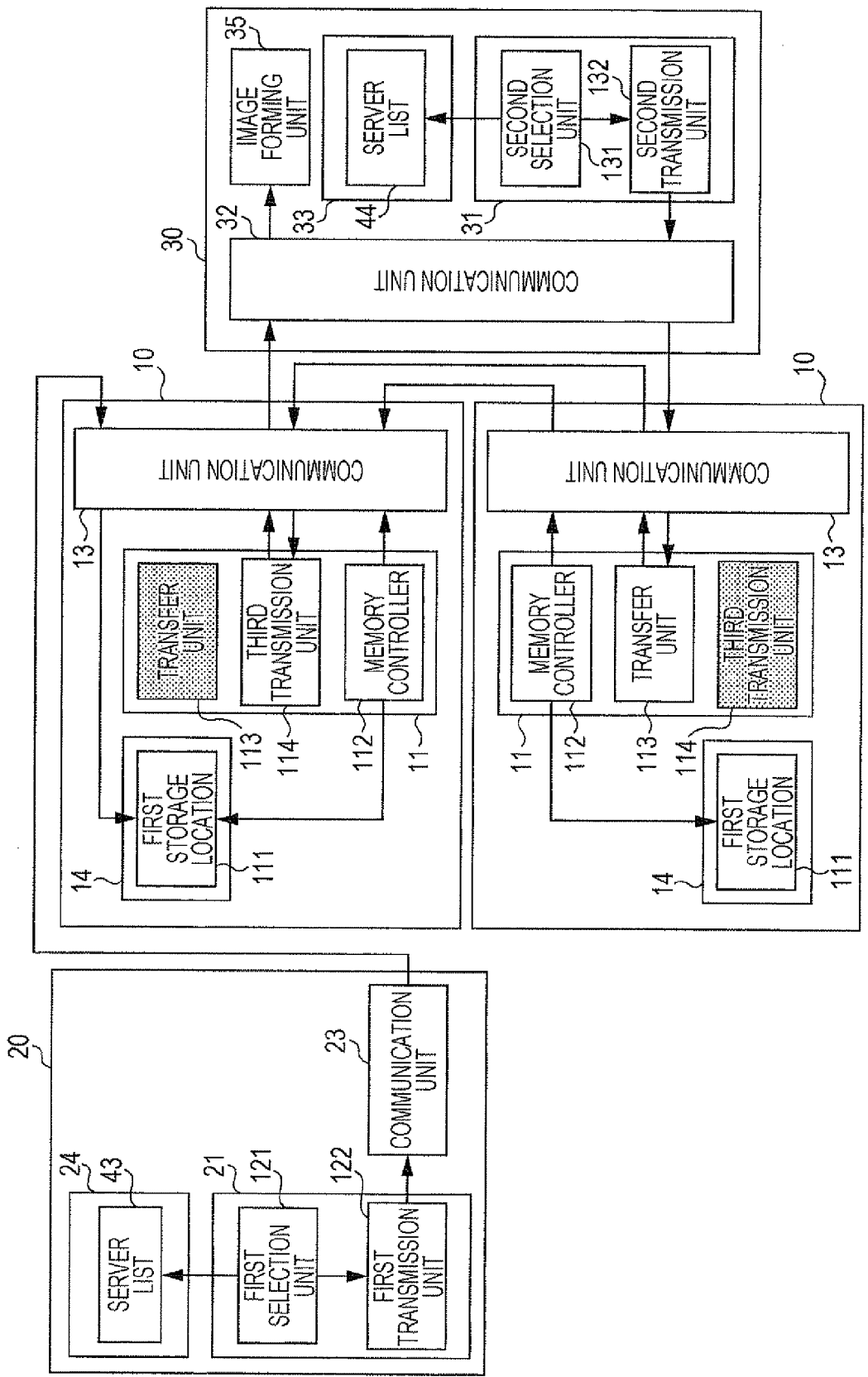
FIG. 8 illustrates a functional configuration of the image forming system.

FIG. 8 illustrates the functional configuration of the image forming system 1. A first selection unit 121 and a first transmission unit 122 may be implemented by executing a program on the CPU 21 of the client device 20. A second selection unit 131 and a second transmission unit 132 may be implemented by executing a program on the CPU 37 of each of the image forming devices 30. A first storage location 111 is provided in the storage unit 14 of each of the server devices 10. A memory controller 112, a transfer unit 113, and a third transmission unit 114 may be implemented by executing a program on the CPU 11 of each of the server devices 10. In the image forming system 1, one of the server devices 10 has substantially the same functionality as the other server devices 10.

The first selection unit 121 selects an available server device 10 having the highest priority in the server list 43 stored in the storage unit 24. The first transmission unit 122 controls the communication unit 23 to transmit the user ID identifying the user and the image data associated with the user ID to the server device 10 selected by the first selection unit 121. The first storage location 111 stores the user ID and image data transmitted from the first transmission unit 122 in association with each other. The memory controllers 112 of the respective server devices 10 control the communication units 13 to exchange information regarding image data stored in the first storage locations 111 in the respective server devices 10. The memory controllers 112 of the respective server devices 10 further cause server information identifying each of the server devices 10 and the user ID stored in association with image data in the first storage location 111 of the server device 10 to be stored in the storage units 14 in association with each other.

When a user ID is input from a user, the second selection unit 131 selects an available server device 10 having the highest priority from among the server devices 10 in the server list 44 stored in the storage unit 33. The second transmission unit 132 controls the communication unit 32 to transmit the input user ID to the server device 10 selected by the second selection unit 131. The user ID transmitted from the second transmission unit 132 is received at the communication unit 13. If no image data is stored in the first storage location 111 in association with the user ID, the transfer unit 113 controls the communication unit 13 to transfer the user ID to a server device 10 identified by the server information stored in association with the user ID in the storage unit 14. The user ID transmitted from the second transmission unit 132 is received at the communication unit 13. If image data is stored in the first storage location 111 in association with the user ID or if a user ID is transferred from the transfer unit 113 of another server device 10, the third transmission unit 114 controls the communication unit 13 to transmit the image data stored in the first storage location 111 in association with the user ID to the image forming device 30. The image forming unit 35 forms an image corresponding to the image data transmitted from the third transmission unit 114.

Figure 9:
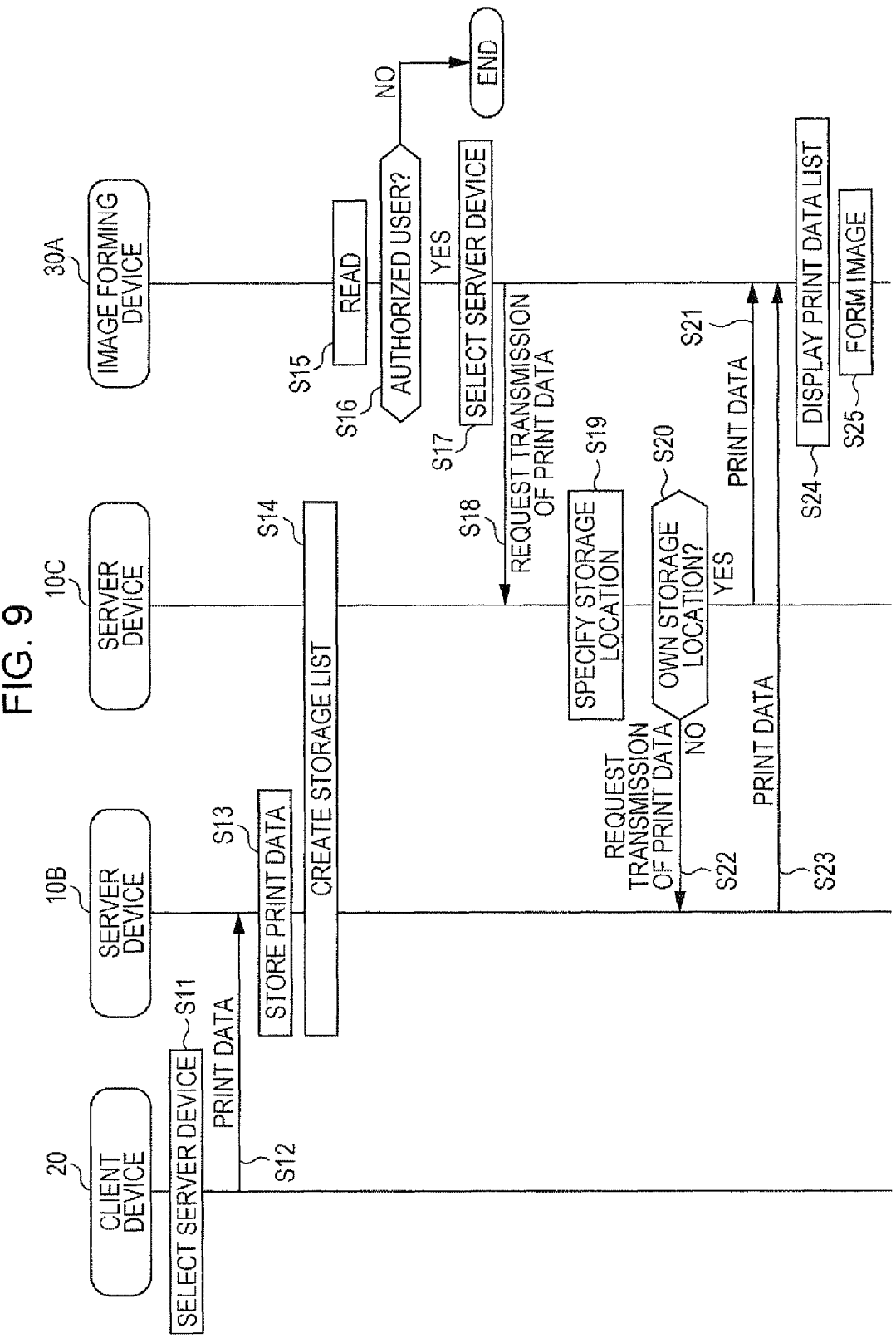
FIG. 9 is a sequence chart illustrating the operation of an image forming system according to an exemplary embodiment.

FIG. 9 is a sequence chart illustrating the operation of the image forming system 1. A user specifies image data and instructs the formation of an image by using the operation unit 25 of the client device 20. The CPU 21 executes the printer driver 42 to generate print data including the image data specified by the user and the user ID of the user. It is assumed here that image data D1 has been specified by the user. As described above, the user ID "user001" of the user is set in the printer driver 42. In this case, the print data includes the image data D1 and the user ID "user001".

When print data is generated, the CPU 21 selects a server device 10 having the highest priority among available server devices 10 on the basis of the server list 43 stored in the storage unit 24 (step S11). When a server device 10 is selected, the CPU 21 controls the communication unit 23 to transmit the generated print data to the selected server device 10 (step S12). Specifically, first, the CPU 21 transmits a test message to the server device 10 having the highest priority. The test message may be information used to determine whether or not the client device 20 is able to successfully communicate with the server device 10. Upon receipt of a response from the server device 10 to the test message, the CPU 21 specifies the server device 10 as an available server device 10. That is, the CPU 21 specifies an available server device by transmitting information for determining whether or not successful communication is possible to a server device 10. The term "available", as used herein, means the server device 10 is able to store print data. Here, by way of example, a server device 10 may be regarded as being available if successful communication with the server device 10 is possible.

In the server list 43 illustrated in FIG. 4, priority "1" and server information "serverA" are associated with each other. In this case, the CPU 21 transmits a test message to the server device 10A. Upon receipt of a response from the server device 10A, the CPU 21 determines that the server device 10A is available. In this case, the CPU 21 transmits print data to the server device 10A. For example, if a failure has occurred in the server device 10A or if a failure has occurred in the communication line 2 between the client device 20 and the server device 10A, no response is obtained from the server device 10A. If no response is transmitted from the server device 10A within a predetermined period of time, the CPU 21 determines that the server device 10A is not available. In this case, the CPU 21 transmits a test message to a server device 10 having the second highest priority. In the server list 43 illustrated in FIG. 4, priority "2" and server information "serverB" are associated with each other. In this case, the CPU 21 transmits a test message to the server device 10B, and determines whether or not the server device 102 is available by using a method similar to that described above. If the server device 10B is available, the CPU 21 transmits print data to the server device 10B. If the server device 10B is not available, the CPU 21 performs a similar process for the server device 10C having the third highest priority. It is assumed here that a failure has occurred in the server device 10A having the highest priority. In this case, since no response is obtained from the server device 10A, the CPU 21 transmits print data to the server device 10B having the second highest priority.

Upon receipt of the print data from the client device 20, the CPU 11B of the server device 10B stores the print data in the storage unit 142 (step S13). As described above, the print data transmitted from the client device 20 includes the image data D1 and the user ID "user001". In this case, the storage unit 14B stores the print data including the image data D1 and the user ID "user001". That is, the storage unit 14B stores the image data D1 and the user ID "user001" in association with each other.

When the print data is stored, each of the server devices 10 exchanges information on print data stored therein with the other server devices 10, and generates a storage list 45 (step S14). As described above, since a failure has occurred in the server device 10A, the server device 10A is not able to perform communication. Therefore, here, the server device 10B and the server device 10C exchange information on the print data stored therein, and each of the server devices 10B and 10C generates a storage list 45. In step S13 described above, the print data including the image data D1 and the user ID "user001" is stored in the server device 10B. In this case, the CPU 11B controls the communication unit 13B to transmit the server information "serverB" indicating the server device 10B and the file name of the image data D1 and the user ID "user001", which are included in the print data, to the server device 10C. Also when print data is stored in the server device 10C, similar information is transmitted from the server device 10C to the server device 10B.

Figures 10, 11:
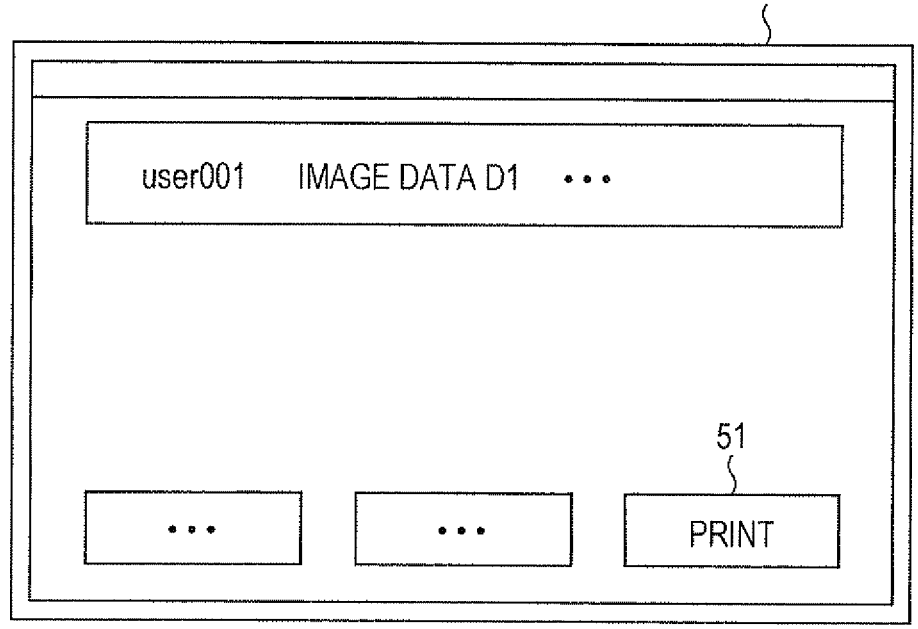
FIG. 10 illustrates an example of a storage list.
FIG. 11 illustrates an example of a print data list according to an exemplary embodiment.

FIG. 10 illustrates an example of the storage list 45. The storage list 45 contains server information indicating each of the server devices 10 and the user ID and the file name of image data, which are included in print data stored in the server device 10. As described above, the print data including the image data D1 and the user ID "user001" is stored in the server device 10B. In the storage list 45 illustrated in FIG. 10, therefore, the server information "serverB" indicating the server device 10B, the user ID "user001", and the file name "image data D1" are associated with each other. Also in the storage list 45, server information "serverC", user ID "user002", and file name "image data D2" are associated with each other. That is, print data including image data D2 specified by a user having user ID "user002" is stored in the server device 10C. As described above, since the information on the print data stored in the server device 10A is not acquired, the storage list 45 does not contain the information. The storage lists 45 created by the CPUs 11B and 11C have common content illustrated in FIG. 10. When the storage lists 45 are generated, the CPUs 11B and 11C cause the generated storage lists 45 to be stored in the storage units 14B and 14C (an example of a third memory), respectively.

After having instructed the formation of an image by using the client device 20, the user moves to a place where any of the image forming devices 30 is located. For example, the user may move to a place where an image forming device 30 that the user usually uses is located, or if an image forming device 30 that the user usually uses is being used by another user, the user may move to a place where a nearby image forming device 30 is located. The user may also move to a place where the closest image forming device 30 to the user is located. That is, the user may move to a place where one of the image forming devices 30 is located in order to use the image forming device 30. It is assumed here that the user moves to the place where the image forming device 30A is located.

The image forming device 30 is configured such that an authentication screen is displayed on the UI unit 34 and operation of the image forming device 30 is not permitted unless authentication is performed. When reaching the image forming device 30A, a user places their IC card above the card reading unit 36A to perform authentication. When the IC card is brought into close proximity to the card reading unit 36A, the card reading unit 36A reads the user ID and password stored in the IC card (step S15). Upon reading the above information from the IC card, the card reading unit 36A inputs the read information to the controller 31A. That is, the card reading unit 36A receives the user ID and password input from the user, and supplies the input user ID and password to the controller 31A. As described above, the IC card stores the user ID "user001" and the password "1234". In this case, the user ID "user001" and the password "1234" are input to the controller 31A.

When a user ID and a password are input, the controller 31A matches the input user ID and password against the user ID and password included in the authentication information 41 stored in the storage unit 33A to determine whether or not the user of the image forming device 30A is an authorized user (step S16). If the input user ID and password are not included in the authentication information 41, the controller 31A determines that the user of the image forming device 30A is not an authorized user (NO in step S16). In this case, the controller 31A displays on the UI unit 34A, for example, a message indicating that authentication has failed, and makes the process end. The authentication information 41 illustrated in FIG. 6 contains the input user ID "user001" and password "1234". In this case, the controller 31A determines that the user of the image forming device 30A is an authorized user (YES in step S16).

If the user of the image forming device 30A is an authorized user, the controller 31A selects a server device 10 having the highest priority among available server devices 10 on the basis of the server list 44 stored in the storage unit 33A (step S17). Upon selecting a server device 10, the controller 31A controls the communication unit 32A to transmit the input user ID to the selected server device 10 to request the server device 10 to transmit print data (step S18). Specifically, as in step S11 described above, first, the controller 31A transmits a test message to a server device 10 having the highest priority to determine whether or not the server device 10 is available. In the server list 44 illustrated in FIG. 7, priority "1" and server information "serverA" are associated with each other. In this case, the controller 31A transmits a test message to the server device 10A. If the server device 10A is available, the controller 31A requests the server device 10A to transmit print data. If the server device 10A is not available, the controller 31A transmits a test message to a server device 10 having the second highest priority to determine whether or not the server device 10 is available. In the server list 44 illustrated in FIG. 7, priority "2" and server information "serverC" are associated with each other. In this case, the controller 31A transmits a test message to the server device 10C. If the server device 10C is available, the controller 31A requests the server device 10C to transmit print data. If the server device 10C is not available, the controller 31A performs a similar process for the server device 10B having the third highest priority. As described above, a failure has occurred in the server device 10A. In this case, no response is obtained from the server device 10A, and therefore the controller 31A transmits the user ID "user001" to the server device 10C having the second highest priority, and requests the server device 10C to transmit print data.

Upon receipt of the user ID and the print data transmission request from the image forming device 30A, the CPU 11C of the server device 100 specifies a storage location where the print data including the received user ID is stored, on the basis of the storage list 45 stored in the storage unit 14C (step S19). In the storage list 45 illustrated in FIG. 10, the user ID "user001" and the server information "serverB" are associated with each other. In this case, the CPU 11C specifies the server device 10B indicated by the server information "serverB".

Next, the CPU 11C determines whether or not the specified storage location is the storage location in the server device 10C (step S20). For example, if the server device 100 is specified in step S19 (YES in step S20), the CPU 11C reads the print data including the received user ID "user001" from the storage unit 14C. Then, the CPU 11C controls the communication unit 13C to transmit the read print data to the image forming device 30A (step S21). In the illustrated example, however, the server device 10B is specified in step S19 (NO in step S20). In this case, the CPU 11C transfers the received user ID to the specified server device 10B, and requests the server device 10B to transmit the print data including the user ID to the image forming device 30A (step S22).

Upon receipt of the user ID and the print data transmission request from the server device 10C, the CPU 11B of the server device 10B reads the print data including the received user ID "user001" from the storage unit 14B. Then, the CPU 11B controls the communication unit 13B to transmit the read print data to the image forming device 30A (step S23). As described above, the print data including the user ID "user001" and the image data D1 is stored in the storage unit 14B. Therefore, the CPU 11B reads the print data from the storage unit 14B, and transmits the read print data to the image forming device 30A.

Upon receipt of the print data transmitted from the server device 10 in step S21 or S23, the controller 31A of the image forming device 30A displays on the UI unit 34A a print data list including the received print data (step S24). FIG. 11 illustrates an example of the print data list displayed on the UI unit 34A. In the print data list, identification information identifying the print data received from the server device 10 is displayed. In the print data list illustrated in FIG. 11, the user ID "user001" and the file name of the image data D1 included in the print data received from the server device 10B are displayed. The user selects print data from the print data list by using the UI unit 34A, and clicks on a "PRINT" button 51. When the "PRINT" button 51 is clicked on, the controller 31A extracts image data from the selected print data, and causes the image forming unit 35A to form an image corresponding to the extracted image data (step S25). For example, when an area where the user ID "user001" and the file name of the image data D1 are displayed in the print data list illustrated in FIG. 11 is selected and the "PRINT" button 51 is clicked on, the image forming unit 35A forms an image corresponding to the image data D1 on a sheet of paper and outputs the sheet of paper.

The present invention is not to be limited to the foregoing exemplary embodiment, and various modifications may be made to the foregoing exemplary embodiment as follows. The following modifications may be used in combination.

First Modification

Figure 12:
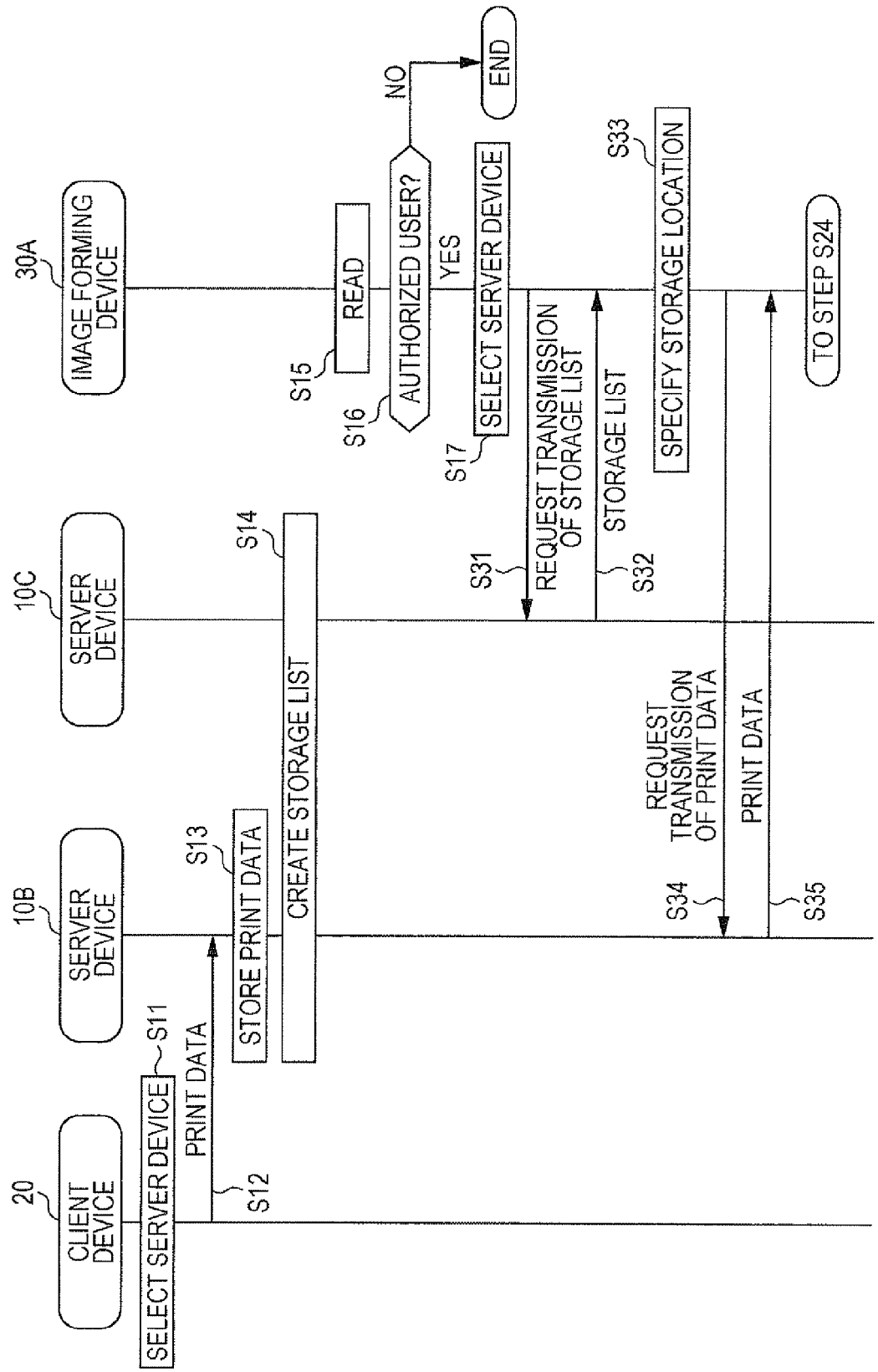
FIG. 12 is a sequence chart illustrating the operation of an image forming system according to a modification.

In the foregoing exemplary embodiment, the process of specifying a storage location for storing print data is performed by the server device 10. In a modification, the process may be performed by the image forming device 30. FIG. 12 is a sequence chart illustrating the operation of the image forming system 1 according to this modification. As in the exemplary embodiment described above, after selecting the server device 10C in step S17, the controller 31A of the image forming device 30A requests the selected server device 10C to transmit the storage list 45 (step S31). Upon receipt of the request from the image forming device 30A, the CPU 11C of the server device 100 reads the storage list 45 from the storage unit 14C. Then, the CPU 11C controls the communication unit 13C to transmit the read storage list 45 to the image forming device 30A (step S32). The controller 31A of the image forming device 30A (an example of a second acquisition unit) receives (or acquires) the storage list 45 transmitted from the server device 10C through the communication unit 32A. Upon receipt of the storage list 45, as in step S19 described above, the controller 31A specifies a storage location where the print data including the input user ID is stored, on the basis of the received storage list 45 (step S33). Next, the controller 31A controls the communication unit 32A to transmit the input user ID to the specified storage location to request the transmission of the print data including the user ID (step S34). For example, if the server device 10B is specified in step S33, the controller 31A transmits the input user ID to the server device 10B. Upon receipt of the user ID and the print data transmission request from the image forming device 30A, the CPU 11B of the server device 10B reads the print data including the received user ID from the storage unit 14B, and transmits the print data to the image forming device 30A through the communication unit 13B (step S35). The controller 31A of the image forming device 30A (an example of a first acquisition unit) receives (or acquires) the print data transmitted from the server device 10B through the communication unit 32A. Upon receipt of the print data, the controller 31A proceeds to step S24 described above.

Second Modification

If none of the server devices 10 is available in step S11 described above, the client device 20 may transmit print data to the image forming device 30. In this case, an image forming device 30 to which print data is to be transmitted in that case is set in advance in the printer driver 42. It is assumed here that the image forming device 30B has been set in the printer driver 42 as an image forming device 30 to which print data is to be transmitted in that case. If no response is returned from the server devices 10 in step S11 described above, in step S12, the CPU 21 of the client device 20 transmits print data to the image forming device 30B. Upon receipt of the print data from the client device 20, the controller 31B of the image forming device 30B causes the print data to be stored in the storage unit 33B (an example of a second storage location).

Further, the CPU 21 (an example of a display controller) displays on the display unit 26 a message indicating that the print data has been stored in the image forming device 30B. The message allows the user to recognize that their print data has been stored in the image forming device 30B rather than in the server device 10. In this case, the user moves to a place where the image forming device 30B is located, and places their IC card above the card reading unit 36B to perform authentication. When the IC card is brought in proximity close to the image forming device 30B, as in the foregoing exemplary embodiment, the image forming device 30B performs the processing of steps S15 and S16. It is to be noted that if print data is transmitted directly from the client device 20 to the image forming device 30B, the processing of steps S17 to S23 is not performed. After the user performs authentication in step S16, the controller 31B accesses the storage unit 33B, and specifies the print data including the input user ID. Then, the controller 31B executes the formation of an image in accordance with the specified print data.

Third Modification

In the foregoing exemplary embodiment, the storage list 45 is created from the beginning when print data is stored in any of the server devices 10. However, the storage list 45 may be created by regularly exchanging, between the server devices 10, information on print data stored in the server devices 10. In this case, when print data is stored in any of the server devices 10, only information on the print data may be exchanged between the server devices 10 and may be added to the storage list 45 in each of the server devices 10.

Fourth Modification

In the foregoing exemplary embodiment, print data is stored in only one of the plural server devices 10. However, print data may be stored in plural server devices 10. For example, the client device 20 may transmit print data to plural server devices 10. Specifically, when transmitting print data in step S11 described above, the CPU 21 of the client device 20 may transmit the print data to both a server device 10 having the highest priority and a server device 10 having the second highest priority among available server devices 10. For example, in the foregoing exemplary embodiment, a failure has occurred in the server device 10A having the highest priority. In this case, the CPU 21 may transmit the print data to the server device 10B having the second highest priority and the server device 10C having the third highest priority.

Furthermore, a server device 10 that has received print data from the client device 20 may copy the print data and transmit the copied print data to another server device 10. In this case, a destination storage location to which print data is to be copied has been set in each of the server devices 10 in advance. It is assumed here that the server device 10C has been designated as destination storage location in the server device 10B. In this case, upon receipt of print data from the client device 20, the CPU 11B of the server device 108 may copy the print data and transmit the copied print data to the server device 10C.

In this case, after transmitting the print data to the image forming device 30A in step S23 described above, the CPU 11B of the server device 10B may transmit information for instructing the deletion of the print data to the server device 10C. Upon receipt of the information, the CPU 11C of the server device 10C deletes the specified print data.

Fifth Modification

In the foregoing exemplary embodiment, print data including the user ID "user001" is stored only in the server device 10B. In a modification, for example, first print data including the user ID "user001" and the image data D1 may be stored in the server device 10B, and second print data including the user ID "user001" and image data D3 may be stored in the server device 10C. In this case, the second print data is transmitted to the image forming device 30A from the server device 10C in step S21 described above, and the first print data is transmitted to the image forming device 30A from the server device 10B in step S23. Upon receipt of the first print data and the second print data, in step S24 described above, the controller 31A of the image forming device 30A displays on the UI unit 34A a print data list including the received first print data and second print data.

Figure 13:
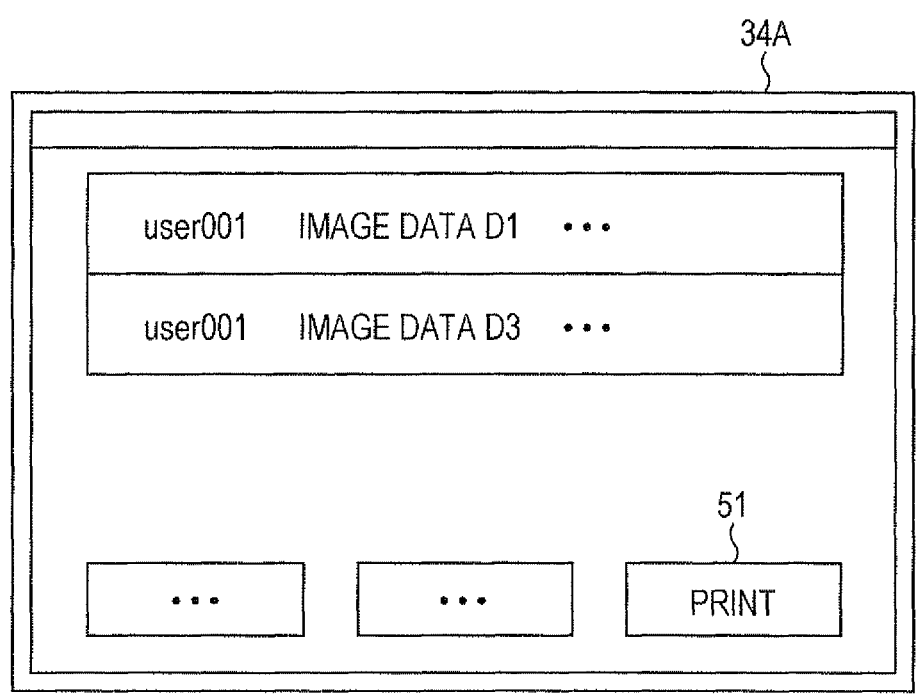
FIG. 13 illustrates an example of a print data list according to a modification.

FIG. 13 illustrates an example of the print data list according to this modification. In the print data list, identification information identifying the first print data (the user ID "user001" and the file name of the image data D1) and identification information identifying the second print data (the user ID "user001" and the file name of the image data D3) are displayed. Although the first print data and the second print data have been acquired from different storage locations, the identification information identifying the first print data and the identification information identifying the second print data are displayed side by side in the print data list. Thus, the first print data and the second print data appear to be stored in the same storage location.

Sixth Modification

The numbers of server devices 10, client devices 20, and image forming devices 30 in the image forming system 1 are not limited to those illustrated in FIG. 1. For example, the numbers of server devices 10, client devices 20, and image forming devices 30 may be increased in accordance with the number of users.

Seventh Modification

User authentication may be performed without using IC cards. For example, a user may input their user ID and password by using the UI unit 34 of the image forming device 30. Instead of a user ID and a password, biological information such as a fingerprint may be used. In this case, the image forming device 30 has a device operable to read the biological information.

Eighth Modification

The image forming device 30 may be a printer that forms an image using a method other than an electrophotographic method. The image forming device 30 may also be configured to form a black and white image or form a color image. The image forming device 30 may also have a copying function and a scanning function.

Ninth Modification

The program to be executed by the CPU 11, 21, or 37 may be provided as being recorded on a recording medium such as a magnetic tape, a magnetic disk, a flexible disk, an optical disk, a magneto-optical disk, or a memory, and may be installed into the server device 10, the client device 20, or the image forming device 30. The program may also be downloaded into the server device 10, the client device 20, or the image forming device 30 via a communication line such as the Internet.

Tenth Modification

The image forming device 30A may acquire print data by accessing all the server devices 10 indicated by the server information contained in the server list 44 in the storage unit 33A without performing the process of selecting a server device 10 in step S17 described above. The image forming device 30A may access the server devices 10 at the same time or may access the server devices 10 in predetermined order. In this case, the server list 44 may not necessarily contain the priorities described above. Specifically, when a user is authenticated in step S16, the controller 31A transmits the user ID to all the server devices 10 indicated by the server information contained in the server list 44 in the storage unit 33A, and requests the transmission of print data. Upon receipt of the request, the CPU 11 of each of the server devices 10 determines whether or not the user ID transmitted from the image forming device 30A has been stored in the storage unit 14. If the user ID has been stored in the storage unit 14, the CPU 11 transmits print data including the user ID to the image forming device 30A through the communication unit 13. Upon receipt of the print data transmitted from any of the server devices 10, the controller 31A (an example of a first acquisition unit) receives (or acquires) the print data through the communication unit 32A.

Eleventh Modification

A user may select bulk printing or selective printing. The term "bulk printing" refers to the printing of all the images corresponding to print data of a user stored in the server device 10. The term "selective printing" refers to the formation of only a user-selected image corresponding to print data among the images corresponding to print data of a user stored in the server device 10. In this case, when a user is authenticated in step S16 described above, the image forming device 30A displays on the UI unit 34A a screen for allowing the user to select bulk printing or selective printing.

When the user selects bulk printing, as in step S18 described above, the controller 31A controls the communication unit 32A to request the server device 10C selected in step S17 to transmit print data. In this case, the controller 31A controls the communication unit 32A to transmit an instruction for printing print data corresponding to the user ID, in addition to the user ID described above, to the server device 10C. When the user ID and the printing instruction are transmitted from the image forming device 30A, the CPU 11C of the server device 10C receives the user ID and the printing instruction through the communication unit 13C. In this manner, upon receipt of a user ID and a printing instruction from the image forming device 30A, a server device 10 performs the processing of steps S19 to S23 described above. Upon receipt of print data from the server device 10, the image forming device 30A proceeds to step S25 without performing the process of displaying a print data list in step S24 described above. Then, the image forming device 30A forms an image corresponding to the received print data. In this case, the user need not select print data.

If the user selects selective printing, as in step S31 described above, the controller 31A controls the communication unit 32A to request the server device 10C selected in step S17 to transmit a storage list. In this case, the controller 31A controls the communication unit 32A to transmit the user ID input from the user to the server device 10C. In this manner, when the image forming device 30A issues a storage list request, the server device 10C performs the following process. The CPU 11C controls the communication unit 13C to transmit the storage list 45 stored in the storage unit 14C to the image forming device 30A as in step S32 described above. In this case, the CPU 11C transmits to the image forming device 30A only a portion corresponding to the user ID transmitted from the image forming device 30A within the storage list 45 stored in the storage unit 14C. For example, if the user ID transmitted from the image forming device 30A is "user001", the CPU 11C extracts the record including the user ID "user001" from the storage list 45 illustrated in FIG. 10, and generates a storage sub-list 45A including only the extracted record. Then, the CPU 11C controls the communication unit 13C to transmit the generated storage sub-list 45A to the image forming device 30A. When the storage sub-list 45A is transmitted from the server device 10C, the controller 31A receives the storage sub-list 45A through the communication unit 32A. In this case, in step S33 described above, the controller 31A specifies a storage location where print data including the input user ID is stored, using the received storage sub-list 45A.

In addition, upon receipt of the storage sub-list 45A from the server device 10C, the controller 31A may display a print data list on the UI unit 34A using the user ID and the file name contained in the storage sub-list 45A. When a user selects print data from the print data list, the controller 31A specifies a storage location where the selected print data is stored, using the received storage sub-list 45A. Then, the controller 31A controls the communication unit 32A to request the server device 10 having the specified storage location to transmit the print data as in step S34 described above. When the print data is transmitted from the server device 10 in response to the request, the controller 31A receives the print data through the communication unit 32A. In this case, the controller 31A proceeds to step S25 without performing the process of displaying a print data list in step S24 described above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and they equivalents.

What is claimed is:

1. An image forming system comprising:
a plurality of server devices;
a transmission device; and
a first image forming device,
the transmission device including
a first memory that stores first priorities set individually for the plurality of server devices,
a first selection unit that selects an available server device for which the first priority stored in the first memory is highest from among the plurality of server devices, and
a first transmission unit that transmits identification information identifying a user and image data associated with the identification information to the server device selected by the first selection unit,
each of the plurality of server devices including
a first storage location in which the identification information and image data transmitted from the first transmission unit are to be stored in association with each other,
the first image forming device including
a second memory that stores server information identifying the plurality of server devices,
a first acquisition unit that, upon receipt of identification information input from a user, acquires image data stored in association with the input identification information from the first storage location in a server device identified by the server information stored in the second memory among the plurality of server devices, and
a first image forming unit that forms an image corresponding to the image data acquired by the first acquisition unit,
wherein the server devices exchange information on print data stored therein, and generate a storage list, and store the storage list in a third memory.

2. The image forming system according to claim 1, wherein each of the plurality of server devices further includes a memory controller that causes the third memory to store, in association, server information identifying each of the plurality of server devices and identification information stored in association with image data in the first storage location in the server device,
wherein the second memory stores second priorities set individually for the plurality of server devices,
wherein the first image forming device further includes
a second selection unit that, upon receipt of identification information input from a user, selects an available server device for which the second priority stored in the second memory is highest from among the plurality of server devices, and
a second acquisition unit that acquires, from the server device selected by the second selection unit, server information stored in association with the input identification information in the third memory, and
wherein the first acquisition unit acquires the image data stored in association with the input identification information from the first storage location in the server device identified by the server information acquired by the second acquisition unit.

3. The image forming system according to claim 1, wherein the first image forming device further includes a second transmission unit that transmits to the server device selected by the second selection unit the input identification information and an instruction for printing image data corresponding to the input identification information, and
wherein each of the plurality of server devices further includes
a transfer unit that, upon receipt of the identification information and the instruction transmitted from the second transmission unit, if no image data is stored in association with the identification information in the first storage location in the server device, transfers the identification information to a server device identified by server information stored in association with the identification information in the third memory, and
a third transmission unit that, upon receipt of the identification information and the instruction transmitted from the second transmission unit, if image data is stored in association with the identification information in the first storage location in the server device or if the identification information is transferred from the transfer unit of another server device, transmits image data stored in association with the identification information in the first storage location to the first image forming device.

4. The image forming system according to claim 1, further comprising a second image forming device,
wherein the first transmission unit transmits the identification information on the user and the image data to the second image forming device when none of the plurality of server devices is available,
wherein the transmission device further includes a display controller that causes a display to display a message indicating that the image data has been stored in the second image forming device, and
wherein the second image forming device includes
a second storage location in which the identification information and image data transmitted from the first transmission unit are to be stored in association with each other, and
a second image forming unit that, upon receipt of the identification information input from the user, forms an image corresponding to the image data stored in the second storage location in association with the input identification information.

5. An image forming system comprising:
a plurality of server devices;
a transmission device; and
a first image forming device,
the transmission device including
a first memory that stores first priorities set individually for the plurality of server devices,
a first selection unit that selects an available server device for which the first priority stored in the first memory is highest from among the plurality of server devices, and
a transmission unit that transmits identification information identifying a user and image data associated with the identification information to the server device selected by the first selection unit,
each of the plurality of server devices including
a storage location in which the identification information and image data transmitted from the transmission unit are to be stored in association with each other, and
a memory controller that causes a third memory to store, in association, server information identifying each of the plurality of server devices and identification information stored in association with image data in the storage location in the server device, the first image forming device including a second memory that stores second priorities set individually for the plurality of server devices, a second selection unit that, upon receipt of identification information input from a user, selects an available server device for which the second priority stored in the second memory is highest from among the plurality of server devices, a first acquisition unit that acquires, from the server device selected by the second selection unit, server information stored in association with the input identification information in the third memory, a second acquisition unit that acquires image data stored in association with the input identification information from the storage location in a server device identified by the server information acquired by the first acquisition unit among the plurality of server devices, and an image forming unit that forms an image corresponding to the image data acquired by the second acquisition unit, wherein the server devices exchange information on print data stored therein, and generate a storage list, and store the storage list in the third memory.

* * * * *